ical notation: $F_{(4, 25)}$...

United States Patent [19]
Brumfield et al.

[11] 3,770,129
[45] Nov. 6, 1973

[54] MANUALLY FLEXIBLE BLOOD FILTER

[75] Inventors: Robert C. Brumfield, Laguna Beach; Edward E. Simmons, Pasadena, both of Calif.

[73] Assignee: Williams Harvey Research Corporation, Santa Ana, Calif.

[22] Filed: May 15, 1972

[21] Appl. No.: 253,569

[52] U.S. Cl............... 210/232, 210/266, 210/282, 210/289, 210/448, 210/452, 128/214
[51] Int. Cl........................................ B01d 29/08
[58] Field of Search................... 210/282, 289, 266, 210/23, 448, 446, DIG. 23, 336, 232, 233, 317, 451–452; 128/214

[56] References Cited
UNITED STATES PATENTS
3,701,433  10/1972  Krakauer et al.................. 210/446
3,593,854  7/1971   Swank............................... 210/446

Primary Examiner—Michael Rogers
Assistant Examiner—Benoit Castel
Attorney—J. L. Jones

[57] ABSTRACT

A length of elastomeric external tubing having a thin, blood impervious wall has a length of a blood permeable, flexible filter bag coaxially disposed inside. A first open terminus of the tubing and the bag open terminus are concentrically disposed together in a first closure means. A compressible filter mat is coaxially disposed inside the length of the filter bag and a flexible, elastomeric blood outlet collection manifold tube is coaxially disposed inside the filter mat. The manifold tube has an open terminus coaxially secured to a flexible elastomeric diaphragm of the first closure means, the first means providing a blood outlet conduit. A second closure means concentrically secures the second terminus of the elastomeric tubing, the second closure means providing the flexible blood filter a blood inlet conduit.

10 Claims, 4 Drawing Figures

PATENTED NOV 6 1973 3,770,129
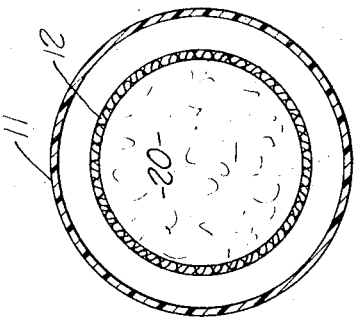
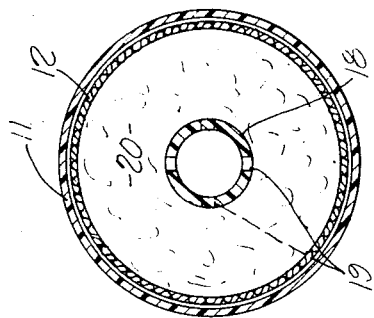
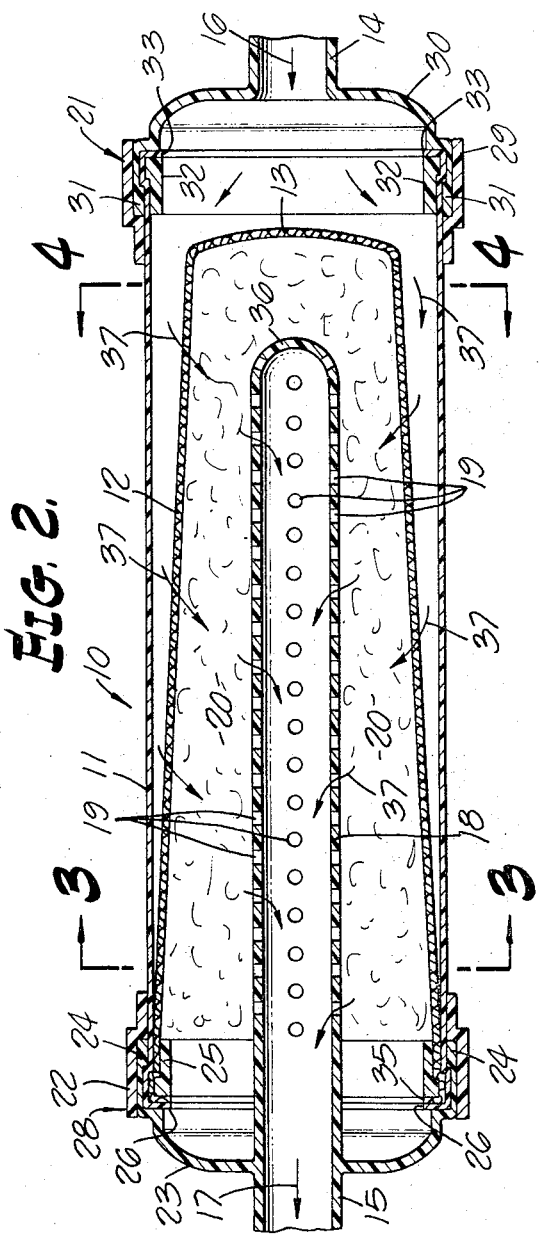
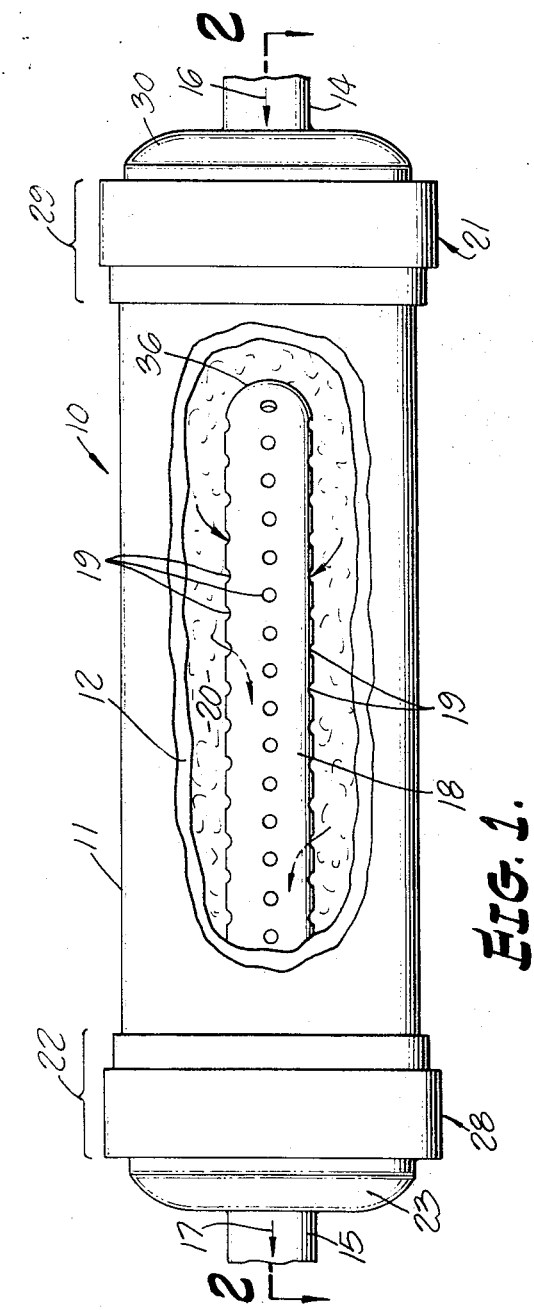

MANUALLY FLEXIBLE BLOOD FILTER

CROSS REFERENCES TO RELATED APPLICATIONS

This application is related to the following applications filed earlier by the sole inventor, Robert C. Brumfield:

U.S. patent application, Ser. No. 167,965 for COMPRESSIBLE DISPOSABLE FILTER PRESS FOR BLOOD, by Robert C. Brumfield, filed Aug. 2, 1971; and, U.S. patent application, Ser. No. 222,124 for CARDIOTOMY RESERVOIR, by Robert C. Brumfield, filed Jan. 31, 1972.

BACKGROUND OF THE INVENTION

Blood filters useful for treating stored human blood and reclaiming blood from a patient's surgical field are classified in Class 210. The relevant subclasses include Subclass 23, 314, 446, and 505. Further apparatus for reclaiming blood from a surgical field are found under Class 128 Subclasses 214 and 276.

Swank in U.S. Pat. No. 3,448,041 and 3,593,854 discloses a method of treating stored human blood, removing contained platelet-leucocyte aggregates by passing the blood through a mat of fibrous material having a large surface area.

Urkiewicz in U.S. Pat. No. 3,527,572, issued Sept. 8, 1970, discloses an extra-corporeal oxygenating device made of at least two peripherally sealed flexible plastic envelopes within which chambers are formed for oxygenating, defoaming, filtering and reservoiring blood along a passageway extending through the envelopes.

Dyer, in U.S. Pat. No. 3,492,991, issued Feb. 3, 1970, discloses a container equipped with blood defoaming and filtering means, the container being closed and connected by tubing to a pump serving as a source of motive power. The container is equipped with a filter through which the blood will pass to remove all particulate matter, and then exits from the container in a conventional gravity type feed for transfusion and the like.

Greenwalt et al in U.S. Pat. No. 3,462,361, issued Aug. 19, 1969, discloses a method and apparatus for treating blood in which the leucocytes are removed by absorption on a column of fibers.

Broman in U.S. Pat. No. 3,035,575, issued May 22, 1962, discloses a flexible cylindrical tube whose walls can be squeezed to provide a manually operable blood pump containing a rudimentary filter element.

Gollan, in U.S. Pat. No. 2,833,279, issued May 6, 1958, discloses a rudimentary blood oxygenating apparatus which incorporates a defoaming section which can also act as a filter element.

The subject invention teaches a manually flexible blood filter combination providing an effective filter for stored blood or blood removed from a patient's surgical field. The filter can be simply manually operated by a member of the surgical team to remove accumulated free gas from the blood prior to filtering the blood and returning it to the patient's extra-corporeal circulatory system.

SUMMARY OF THE INVENTION

A disposable, single use, manually flexible blood filter has a length of elastomeric external tubing having a thin, blood impervious wall, a first and a second tubing terminus, and a tubing cylinder axis. A length of a blood permeable flexible filter bag has a diameter cooperatively sized and cooperatively disposed, fitting inside the length of the elastomeric external tubing. A first open terminus of the filter bag cooperatively, concentrically co-terminates with the first terminus of the length of external tubing, and a second terminus of the length of bag has a closure seal, the closure seal terminus being disposed inside and adjacent to the second terminus of the length of external tubing. A compressible filter mat is coaxially disposed inside the flexible filter bag, the mat extending substantially the length of the bag and the mat being uniformly disposed adjacent to the interior wall of the bag. A flexible, elastomeric blood outlet collection manifold tube is coaxially disposed along the bag's cylinder axis inside a uniform wall thickness of the filter mat. The manifold tube has a first terminus disposed inside the filter mat and an open tube second terminus joining a blood outlet conduit. Multiple apertures are disposed in the manifold tube wall. A first removable closure means concentrically secures the first terminus of the elastomeric external tubing, and the first terminus of the bag concentrically disposed inside the tubing. The first closure means has a blood outlet conduit conductively secured to the blood manifold tube and has a flexible elastomeric diaphragm. A second removable closure means concentrically secures the second terminus of the external tubing, the second closure means having a flexible elastomeric closure diaphragm providing closure means flexure. The second closure means has a blood inlet conduit conductively secured thereto. The flexible elastomeric closure diaphragms provide surface puncturable by a syringe needle for removal of entrained gas bubbles from the incoming blood stream.

Other objects and advantages of this invention are taught in the following description and claims.

BRIEF DESCRIPTION OF THE DRAWINGS

A description of this invention is to be read in conjunction with the following drawings:

FIG. 1, is an elevational perspective partial sectional view of the flexible blood filter.

FIG. 2 is an elevational sectional view through 2—2 of FIG. 1.

FIG. 3 is an elevational cross sectional view through 3—3 of FIG. 2.

FIG. 4 is another cross sectional view through 4—4 of FIG. 2.

DESCRIPTION OF THE PREFERRED EMBODIMENT

Referring to FIGS. 1 and 2 in detail, the manually flexible blood filter 10 has a length of elastomeric, thin wall, blood impervious external tubing 11 forming the exterior wall of the flexible blood filter. A length of a blood permeable flexible filter bag 12 has a diameter cooperatively sized and coaxially disposed fitting inside the length of elastomeric tubing 11. A first open terminus 35 of the filter bag 12 cooperatively concentrically co-terminates at the first terminus 26 of the tubing 11, as shown in FIG. 2. A second terminus 13 of the flexible filter bag 12 has a closure seal, the second bag terminus 13 being disposed inside and adjacent the second terminus 33 of the tubing 11.

A compressible filter mat 20 is coaxially disposed inside the flexible filter bag 12, the mat extending substantially the length of bag 12. The mat 20 thickness is uniformly disposed adjacent to the interior wall of the bag 12.

A flexible elastomeric membrane first closure diaphragm 23 is integrally sealed to a flexible elastomeric blood outlet collection manifold tube 18 which is coaxially disposed in the cooperatively aligned tubing 11 and flexible filter bag 12. The collection manifold tube 18 is coaxially disposed in the uniform wall thickness of filter mat 20, the manifold tube 18 having a first terminus 36 disposed inside the filter mat, and an open second tube terminus extending to a blood outlet conduit 15 integrally secured to the diaphragm 23. The diaphragm 23 has a compression retainer seal ring 24 integrally concentrically disposed on the diaphragm perimeter. A first pair of concentric mating compression collars 28 has a first outer collar 22 and a first inner collar 25. The first open terminus 26 of the exterior tubing 11 is concentrically disposed on the exterior of the inner collar 25 and a first terminus 35 of the filter bag 12 is cooperatively concentrically disposed interiorly under the terminus 26 of the tubing 11, on the first inner mating collar 25. The outer compression collar 22 is compressively seated on the combination of the retainer ring 24, the terminus 26 of tubing 11 and the terminus 35 of bag 12, providing a fluid tight seal for the flexible blood filter 10.

A second pair of concentric mating compression collars 21 have an outer mating collar 29 and an inner mating collar 32. The second terminus 33 of the exterior flexible tubing 11 is concentrically secured over the mating collar 32. A flexible elastomeric membrane second closure diaphragm 30 has a blood inlet conduit 14 conductively secured to the diaphragm, the diaphram having a compressive retainer seal ring 31 integrally concentrically disposed on the second diaphragm perimeter. The second diaphragm retainer seal ring 31 is concentrically secured over the second terminus 33 of the elastomeric tubing 11, providing a fluid tight seal when the outer mating collar 29 is compressively secured on the seal ring 31.

Operationally the blood, typically stored blood from a transfusion bag or blood recovered from a surgical site, flows in the direction 16 through the blood inlet conduit 14 in and around the filter bag 12 containing the filter mat 20. As denoted by the arrows 37, the blood which can contain clots, surgical debris and the like flows around the bag 12, then through the filter mat 20, and the filtered blood is collected through the multiple apertures 19 which are disposed in the blood collection manifold tube 18. Thence the blood flows out through the blood outlet conduit 15 in the direction denoted by the arrow 17, where the blood can be further processed prior to the return in an extra-corporeal circulation system to the patient. Any air or other gases which may be introduced in the flow of blood can be collected in the dome of the diaphragm 30 and removed by a syringe needle puncturing the diaphragm. The flexible blood filter 10 can be manually squeezed by a member of the surgical team to transport air or other gases, disposing the gas under the inner dome of the diaphragm 23. Typically, the blood filter 10 could be primed with saline solution, transfusion blood or blood extenders prior to its introduction into the extracorporeal system of a patient, thus allowing time in a procedure for the removal of entrapped air which is ordinarily contained in the filter mat 20.

The filter mat 20 can be fibers or an open cell porous sponge. The density of the fibers and the pore size aperture of the foam can be adapted to provide the desired degree of filtering required for the medical application.

FIG. 3 showing a cross sectional view through 3—3 of FIG. 2, illustrates that the exterior flexible elastomeric tubing 11 has concentrically disposed inside a flexible filter bag 12. The flexible elastomeric blood outlet collection manifold tube 18 is shown concentrically disposed within the filter bag 12 having a uniform thickness of filter mat secured disposed around the tube 18. Multiple apertures 19 are shown in the tube 18.

In FIG. 4 taken through 4—4 of FIG. 2, the exterior elastomeric tubing 11 is shown to have the flexible filter bag 12 concentrically disposed therein and the filter mat 20 completely uniformly fills the filter bag. The cylindrical diameter of the tubing 11 can typically range from 1 to 2 inches as is required, and the overall length of the flexible blood filter from the first compression collar to the second compression collar can typically be 4 to 8 inches.

The elastomeric exterior tubing 11 can be surgical grade gum rubber, a polyethylene film, or other flexible plastic compatible with blood. The filter bag 12 can be a like elastomeric film having multiple blood permeable apertures disposed in the bag wall. The filter bag can also be a woven or non-woven textile bag, such as nylon or polyester fiber or cotton or the 'ike, compatible with blood.

Many modifications and variations in the improvement in the manually flexible blood filter can be made in the light of our teaching. It is therefore understood that within the scope of the appended claims, the invention may be practiced otherwise than as specifically described.

I claim:

1. A manually flexible blood filter combination comprising:

a length of elastomeric tubing having a flexible, blood impervious thin wall, a first and a second tubing terminus, and a tubing cylinder axis;

a length of a blood permeable, flexible filter bag having a diameter cooperatively sized and cooperatively disposed to fit inside said length of elastomeric tubing, a first open terminus of said filter bag cooperatively concentrically coterminating with said first terminus of said length of tubing, and a second terminus of said bag having a closure seal, said second bag terminus disposed inside and adjacent said second terminus of said length of tubing;

a compressible filter mat coaxially disposed inside said flexible filter bag, said mat extending substantially said length of bag, said mat uniformly disposed adjacent the interior wall of said bag;

a flexible, elastomeric, blood outlet collection manifold tube coaxially disposed along the bag cylinder axis inside a uniform wall thickness of said filter mat, said manifold tube having a first terminus disposed inside said filter mat, an open manifold tube second terminus extending to a blood outlet conduit, and multiple apertures disposed in the manifold tube wall;

a first removable closure means concentrically securing said second terminus of said manifold tube, said first terminus of said elastomeric tubing, and said first terminus of said bag concentrically disposed inside said tubing, said first closure means having a flexible elastomeric diaphragm providing a surface puncturable by a syringe needle, said first closure means having a blood outlet conduit conductively secured to said blood manifold tube; and, a second removable closure means concentrically securing said second terminus of said tubing, said second closure means having a flexible elastomeric closure diaphragm providing closure means flexure, said second closure means having a blood inlet conduit conductively secured thereto, said closure diaphragm providing a surface puncturable by a syringe needle.

2. The combination of claim 1 wherein said filter mat comprises fibrous composition packing compatible with blood.

3. The combination of claim 1 wherein said filter mat comprises an open cell foam composition compatible with blood and having pore apertures of the required size distribution.

4. The combination of claim 1 wherein said filter bag comprises a plastic film bag having multiple blood permeable apertures disposed in said film wall.

5. The combination of claim 1 wherein said filter bag comprises a textile fiber bag having the required blood permeability.

6. A manually flexible blood filter combination comprising:

a length of elastomeric tubing having a flexible blood impervious, thin wall, a first and second tubing terminus, and a tubing cylinder axis;

a length of a blood permeable flexible filter bag having a diameter cooperatively sized and coaxially disposed to fit inside said length of elastomeric tubing, a first open terminus of filter bag cooperatively concentrically co-terminating at said first terminus of said length of tubing, and a second bag terminus having a closure seal, said second bag terminus disposed inside and adjacent said second terminus of said length of tubing;

a compressible filter mat coaxially disposed inside said flexible filter bag, said mat extending substantially said length of bag, said mat uniformly disposed adjacent the interior wall of said bag;

a flexible elastomeric blood outlet collection manifold tube coaxially disposed along the bag cylinder axis inside a uniform wall thickness of said filter mat, said manifold tube having a first terminus disposed inside said filter mat, an open manifold tube second terminus extending to a blood outlet conduit, and multiple apertures disposed in the manifold tube wall;

a flexible elastomeric membrane first closure diaphragm coaxially integrally sealed to said manifold tube, said first closure diaphragm having a blood outlet conduit coaxially integrally conductively sealed to said manifold tube, said first diaphragm having a compression retainer seal ring integrally concentrically disposed on the first diaphragm perimeter;

a first pair of concentric mating compression collars, having a first outer and a first inner mating collar, said first open terminus of said bag and said first terminus of said tubing concentrically disposed on the exterior of said first inner collar, said first diaphragm retainer ring concentrically secured over said first bag terminus and said first tubing terminus, said first outer mating compression collar disposed on the first diaphragm retainer ring;

a flexible elastomeric membrane second closure diaphragm having a blood inlet conduit coaxially integrally conductively secured to said diaphragm, said second closure diaphragm having a compressive retainer seal ring integrally concentrically disposed on the second diaphragm perimeter; and, a second pair of concentric mating compression collars having a second outer and a second inner mating collar, said second terminus of said tubing concentrically disposed on the exterior of said second inner collar, said second diaphragm retainer ring concentrically secured over said second tubing terminus, said outer mating compression collar disposed on the second diaphragm retaining ring;

whereby blood can be conductively flowed into said blood inlet conduit, filtered through said filter mat, collected in said outlet collection tube, and conducted out through said outlet conduit, and gases can be squeezed into a volume space adjacent to said diaphragms and removed by a syringe needle if desired.

7. The combination of claim 6 wherein said filter mat comprises fibrous composition packing compatible with blood.

8. The combination of claim 6 wherein said filter mat comprises an open cell foam composition compatible with blood and having pore apertures of the required size distribution.

9. The combination of claim 6 wherein said filter bag comprises a plastic film bag having multiple blood permeable apertures disposed in said film wall.

10. The combination of claim 6 wherein said filter bag comprises a textile fiber bag having the required blood permeability.

* * * * *